United States Patent
Ekemark

(10) Patent No.: US 9,055,501 B2
(45) Date of Patent: Jun. 9, 2015

(54) METHOD AND NODE SUPPORTING CELL RESELECTION IN LOAD BALANCED NETWORK

(75) Inventor: Sven Ekemark, Storvreta (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 14/003,592

(22) PCT Filed: Feb. 15, 2012

(86) PCT No.: PCT/SE2012/050157
§ 371 (c)(1),
(2), (4) Date: Sep. 6, 2013

(87) PCT Pub. No.: WO2012/125103
PCT Pub. Date: Sep. 20, 2012

(65) Prior Publication Data
US 2014/0004862 A1 Jan. 2, 2014

Related U.S. Application Data

(60) Provisional application No. 61/452,887, filed on Mar. 15, 2011.

(51) Int. Cl.
*H04W 36/22* (2009.01)
*H04W 72/06* (2009.01)
(Continued)

(52) U.S. Cl.
CPC .............. *H04W 36/22* (2013.01); *H04W 28/08* (2013.01); *H04W 36/06* (2013.01); *H04W 48/08* (2013.01); *H04W 72/0453* (2013.01); *H04W 72/0486* (2013.01); *H04W 72/06* (2013.01)

(58) Field of Classification Search
CPC ...................................................... H04W 36/22
USPC ............... 455/443, 444, 453, 435.2, 524, 525
See application file for complete search history.

(56) References Cited

U.S. PATENT DOCUMENTS

2010/0216469 A1* 8/2010 Yi et al. ..................... 455/435.3
2010/0240367 A1* 9/2010 Lee et al. ................... 455/435.2
(Continued)

FOREIGN PATENT DOCUMENTS

EP 1509056 A2 2/2005
EP 2046081 A1 4/2009

OTHER PUBLICATIONS

3rd Generation Partnership Project, "LTE; Evolved Universal Terrestrial Radio Access (E-UTRA); Requirements for support of radio resource management", Technical specification, 3GPP TS 36.133 version 9.6.0 Release 9, ETSI TS 136 133 V9.6.0, Jan. 1, 2011, pp. 1-402, ETSI, France.

(Continued)

*Primary Examiner* — Cong Tran
(74) *Attorney, Agent, or Firm* — Coats & Bennett, P.L.L.C.

(57) ABSTRACT

The present invention relates to a method in a RN node of a communications system operating on multiple carrier frequencies. The RN node hosts a first cell operating on a first carrier frequency and a second cell overlapping with the first cell and operating on a second carrier frequency. The method comprises broadcasting (501) information comprising a cell reselection priority for each of the first and the second carrier frequency in the first cell, where the priority of the first carrier frequency is the highest. The method also comprises broadcasting (502) information comprising a cell reselection priority for each of the first and the second carrier frequency in the second cell, where the cell reselection priority of the second carrier frequency is the highest. Thereby a UE will primarily perform intra-frequency cell reselection.

12 Claims, 11 Drawing Sheets

(51) Int. Cl.
*H04W 28/08* (2009.01)
*H04W 36/06* (2009.01)
*H04W 48/08* (2009.01)
*H04W 72/04* (2009.01)

(56) References Cited

U.S. PATENT DOCUMENTS

| | | | | |
|---|---|---|---|---|
| 2010/0240368 | A1* | 9/2010 | Fox et al. | 455/435.3 |
| 2010/0290389 | A1* | 11/2010 | Hou et al. | 370/328 |
| 2011/0080895 | A1* | 4/2011 | Iwamura et al. | 370/332 |
| 2011/0105123 | A1* | 5/2011 | Lee et al. | 455/436 |
| 2011/0165909 | A1* | 7/2011 | Huang et al. | 455/525 |
| 2011/0255509 | A1* | 10/2011 | Huang et al. | 370/331 |
| 2013/0016841 | A1* | 1/2013 | Fong et al. | 380/287 |
| 2013/0223235 | A1* | 8/2013 | Hu et al. | 370/242 |

OTHER PUBLICATIONS

3rd Generation Partnership Project, "LTE; Evolved Universal Terrestrial Radio Access (E-UTRA) and Evolved Universal Terrestrial Radio Access Network (E-UTRAN);Overall description; Stage 2", Technical specification, 3GPP TS 36.300 version 9.6.0 Release 9, ETSI TS 136 300 V9.6.0, Jan. 1, 2011, pp. 1-180, ETSI, France.

3rd Generation Partnership Project, "LTE; Evolved Universal Terrestrial Radio Access (E-UTRA); Radio Resource Control (RRC); Protocol specification", Technical specification, 3GPP TS 36.331 version 9.5.0 Release 9, ETSI TS 136 331 V9.5.0, Jan. 1, 2011, pp. 1-225, ETSI, France.

3rd Generation Partnership Project, "3rd Generation Partnership Project; Technical Specification Group Radio Access Network; Evolved Universal Terrestrial Radio Access (E-UTRA); User Equipment (UE) procedures in idle mode (Release 9)", Technical Specification, 3GPP TS 36.304 V9.5.0, Dec. 1, 2010, pp. 1-32, 3GPP, France.

3rd Generation Partnership Project, "LTE; Evolved Universal Terrestrial Radio Access Network (E-UTRAN); X2 Application Protocol (X2AP)", Technical Specification, 3GPP TS 36.423 version 9.5.0 Release 9, ETSI TS 136 423 V9.5.0, Jan. 1, 2011, pp. 1-123, ETSI, France.

Nokia, et al., "E-UTRA Cell Selection and Cell Reselection Aspects", 3GPP TSG-RAN WG2 Meeting #59bis, Shanghai, China, Oct. 8, 2007, pp. 1-12, R2-074051, 3GPP.

Nokia, et al., "E-UTRA Inter-frequency Cell Reselection Aspects", 3GPP TSG-RAN WG2 Meeting #60, Jeju, Korea, Nov. 5, 2007, pp. 1-10, R2-074876, 3GPP, [retrieved on Sep. 6, 2013], retrieved as R2-074880 from internet: http://www.3gpp.org/ftp/tsg_ran/WG2_RL2/TSGR2_60/Docs/.

Ericsson, "Discussions on mobility balancing scenarios and approaches", 3GPP TSG-RAN WG3 #69, Madrid, Spain, Aug. 23, 2010, pp. 1-4, R3-102206, 3GPP.

Nokia, "Frecuency layer convergence principles", GPP TSG-RAN WG2 Meeting #44, Sphia Antipolis, France, Oct. 4, 2004, pp. 1-4, Tdoc #R2-042004, 3GPP.

Nokia Corporation, et al.,"Measurement events considerations for E-UTRAN", 3GPP TSG-RAN WG2 Meeting #60, Jeju, Korea, Nov. 5, 2007, pp. 1-3, R2-074876, 3GPP, [retrieved on Sep. 6, 2013], retrieved from internet: http://www.3gpp.org/ftp/tsg_ran/WG2_RL2/TSGR2_60/Docs/.

* cited by examiner

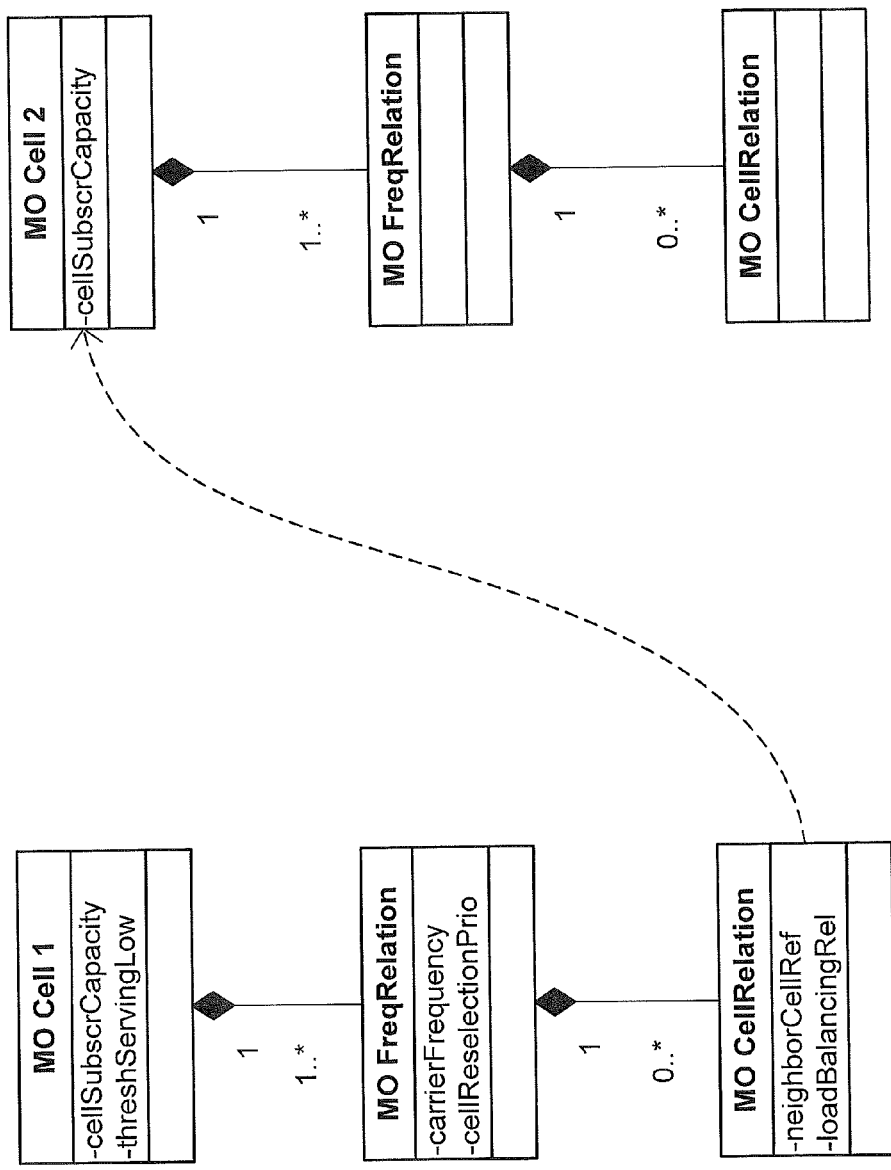

METHOD AND NODE SUPPORTING CELL RESELECTION IN LOAD BALANCED NETWORK

TECHNICAL FIELD

The disclosure relates to cell reselection, and more specifically to a method and a radio network node of a radio communications system operating on multiple carrier frequencies, for constraining cell reselection of a user equipment to intra-frequency cell reselection.

BACKGROUND

3GPP Long Term Evolution (LTE) is the fourth-generation mobile communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an UTRAN and an E-UTRAN, a User Equipment (UE) is wirelessly connected to a Radio Base Station (RBS) commonly referred to as a NodeB (NB) in UMTS, and as an evolved NodeB (eNodeB or eNB) in LTE. An RBS is a general term for a radio network node capable of transmitting radio signals to a UE and receiving signals transmitted by a UE.

FIG. 1a illustrates a radio access network with an RBS 101 that serves a UE 103 located within the RBS's geographical area of service, called a cell 105. In UMTS, a Radio Network Controller (RNC) 106 controls the RBS 101 and other neighboring RBSs, and is, among other things, in charge of management of radio resources in cells for which the RNC is responsible. The RNC is in turn also connected to the core network. In GSM, the node controlling the RBS 101 is called a Base Station Controller (BSC) 106. FIG. 1b illustrates a radio access network in an LTE system. An eNB 101a serves a UE 103 located within the RBS's geographical area of service or the cell 105a. The eNB 101a is directly connected to the core network. The eNB 101a is also connected via an X2 interface to a neighboring eNB 101b serving another cell 105b.

A radio access network, such as an E-UTRAN or an UTRAN, is often deployed on multiple carrier frequencies. A carrier frequency is the centre frequency used for the radio communication between the RBS and the UE. Carrier frequencies are usually gathered in radio frequency bands of a certain width, typically a couple of 10 MHz wide, defined for usage with a particular Radio Access Technology (RAT). The multiple carrier frequencies may each be allocated in different frequency bands, or within a same frequency band. An RBS may provide a number of radio cells on each carrier frequency, pointing in different directions from the RBS.

FIG. 2a schematically illustrates a deployment of a radio access network on three carrier frequencies A, B and C. Cells on the different frequencies may overlap and cover the same area. A UE 203 within an overlapping area may access the network via a cell on either one of the overlapping frequencies. UEs roaming in the network are moving between neighboring cells in order to stay in contact with the network. UE mobility is possible, both between cells of the same carrier frequency, also known as intra-frequency mobility, and between cells of different carrier frequencies, also known as inter-frequency mobility.

The network is usually in control of the mobility of UEs that are in connected mode. The term connected mode is used to denote the state of UEs with an active connection to the network, such as a Radio Resource Control (RRC) state RRC_CONNECTED in E-UTRAN or the CELL_DCH state in UTRAN. The network performs a handover of a UE in connected mode when the UE is moving between cells. An intra-frequency handover moves the UE from one cell to another of the same carrier frequency. An inter-frequency handover moves the UE between cells of different carrier frequencies.

UEs which do not have an active connection to the network are in idle mode. One example of an idle mode state is RRC_IDLE state in E-UTRAN. Idle mode UEs autonomously select a suitable cell when entering the network and may then reselect another cell at any time, based on the cell reselection rules defined for the particular technology. For E-UTRAN, the rules for cell reselection are specified in 3GPP TS 36.304 V10.1.0, section 5.2.

Due to the random nature of the UE mobility, it is often difficult to predict how UEs are distributed between the different carrier frequencies in the network. Coverage gaps and differences in radio propagation conditions on different frequencies may cause UEs to gather in cells of one carrier frequency and not of other carrier frequencies.

It is also a fact that different cells and the different carrier frequencies may offer system capacity that varies within a wide range. For instance, in E-UTRAN the spectrum bandwidth of each carrier frequency may vary in steps between 1.2 MHz and 20 MHz. The cell configuration, the presence of radio interference, and the distribution of UEs within the cell affecting the so called near-far-relations, are examples of other factors influencing the system capacity.

The distribution of UEs within the network can be influenced in different ways. The network may apply handover in order to handle the mobility of UEs in connected mode. For UEs in idle mode, the network uses system information to influence the cell reselection behavior of the UEs. System information is transmitted in each cell and provides the UE with information about eligible carrier frequencies in the neighborhood and with parameters to control the cell selection and cell reselection of the UEs. The system information transmitted in an E-UTRAN cell is specified in 3GPP TS 36.331 V10.1.0, sections 5.2, 6.2.2 and 6.3.1.

In an E-UTRAN, the cell reselection of the UEs is governed by a few main principles:
1. Cell ranking: The UE ranks the cells based on a measurement of a signal strength, the Reference Symbol Receive Power (RSRP), or of a signal quality, Reference Symbol Receive Quality (RSRQ). The UE reselects the cell with the highest rank. Cell ranking is applied between cells located on the same carrier frequency, i.e. intra-frequency cell reselection, and between cells located on different carrier frequencies with equal priority, i.e. equal priority inter-frequency cell reselection (see bullet 2 below).
2. Absolute cell reselection priority: The reselection between cells located on different carrier frequencies, i.e. inter-frequency cell reselection, and between cells located in different Radio Access Technologies (RAT), i.e. inter-RAT cell reselection, is governed by absolute cell reselection priorities. The UE reselects a cell on the carrier frequency or RAT with the highest priority and with a sufficient reception strength or quality (RSRP or RSRQ).

An RBS in an E-UTRAN, i.e. an eNB, broadcasts system information to influence the cell reselection the UEs perform. A few different types of System Information Blocks (SIBs)

are sent out in each cell, providing the UE with information about the alternative E-UTRAN carrier frequencies and about carrier frequencies in other RATs, with the absolute cell reselection priorities, and with a set of parameters to influence cell ranking and to determine the required signal strength and/or quality for reselection of a cell on the various carrier frequencies in E-UTRAN and/or other RATs.

Using the cell reselection priorities, it is possible for the operator to arrange a hierarchy of the different carrier frequencies, where the UEs favor the frequencies with higher priority. For instance, assigning a high priority to E-UTRAN carrier frequencies and a lower priority to other RATs makes the E-UTRAN capable UEs in idle mode to camp on E-UTRAN frequencies where there is E-UTRAN coverage. It is also possible to give priority to E-UTRAN carrier frequencies with inherent high capacity, e.g., a carrier frequency with a bandwidth of 20 MHz, whereas E-UTRAN frequencies with less capacity, e.g., 5 MHz bandwidth, are given lower priority. In this way, the UEs tend to camp on the frequency providing the highest capacity.

When a frequency hierarchy is not desired, the operator may assign the same priority to a number of carrier frequencies. In this way, UEs tend to camp on the carrier frequency providing the best reception, e.g. in terms of RSRP or RSRQ, according to the cell ranking criteria.

In order to achieve good system and end user performance, it is beneficial if UEs are distributed between the available frequencies in a way such that the capacity the network can offer is utilized in a good manner. From a traffic load balancing point of view, neither a hierarchy of carrier frequencies nor the ranking criteria is necessarily the best option.

In a hierarchical deployment, the UEs tend to gather at the carrier frequency with the highest priority if the coverage is similar. As a result, carrier frequencies with low priority might be depleted or underutilized, while other carrier frequencies tend to be overloaded.

In order to equalize the traffic load, the network may have to handover a number of UEs in connected mode towards the low priority carrier frequencies. However, when the UEs are subsequently released to idle mode, they tend to return to a high priority carrier in line with the cell reselection priorities. Therefore, the same procedure has to be repeated over and over again.

The actions required to keep the traffic load balance thus becomes a burden on the network, especially if the network capacity at the low priority carrier frequency is similar to the network capacity at the high priority carrier frequency.

One way to avoid the recurring need for handover in a hierarchical deployment is to "shrink" the high priority cells to allow for load balancing also in idle mode. This can be achieved with an increase of the required signal strength or quality for UEs in those cells. In this way, UEs at the cell edge do not qualify and have to reselect a cell on a carrier frequency of lower priority. This method could be suitable if the coverage of the high priority frequency is naturally more restricted than the coverage of the low priority frequency. This may be the case, for instance, when there are different radio propagation properties in different frequency bands. If such natural differences do not exist the method is not always suitable, because it causes an asymmetric distribution of the UEs within the cells, with most of the UEs at the high priority frequency gathered close to the cell center and the UEs at the low priority frequency deferred towards the cell edge. Asymmetry of this kind may be unfavorable for the overall system capacity and performance.

In a flat deployment, where equal priorities are used, the distribution of UEs between the carrier frequencies is more random. The UEs perform ranking of the cells located on these frequencies, based on the received signal strength and quality, and reselect cells based on that. The ranking of cells on the same carrier frequency is usually a quite adequate basis for the cell reselection, as it allows the UE to move along the carrier and constantly camp on the currently best cell. The best cell should stand out clearly in the ranking, except for the case when the UE is in a typically narrow region close to the cell edge.

However, the ranking of cells on adjacent carriers is more difficult, especially if the cells on multiple frequencies, possibly in the same frequency band, are provided from the same RBS. This situation is not unusual, and the difference in cell ranking criteria can be very subtle. It may furthermore be difficult to tune the ranking criteria to achieve the desired traffic load balance between overlapping cells.

Another obstacle to providing an optimum distribution of UEs to carrier frequencies is that the cell ranking criteria discussed above does not necessarily reflect the desired criteria for traffic load balancing. The RSRP measure does not take the traffic load in a cell into account. The RSRQ measure is sensitive to traffic load, but not necessarily in proportion to the load balancing criteria. Even a small imbalance of the ranking criteria could cause a serious tilt of UE distribution between the cells.

SUMMARY

It is therefore an object to address some of the problems outlined above, and to provide a solution for preserving a UE distribution achieved with load balancing in connected mode, when the UEs are released to idle mode. This object and others are achieved by the method and the radio network node according to the independent claims, and by the embodiments according to the dependent claims.

In accordance with a first embodiment, a method in a radio network node of a radio communications system operating on multiple carrier frequencies, for constraining cell reselection of a user equipment to intra-frequency cell reselection is provided. The radio network node hosts a first cell operating on a first carrier frequency and a second cell overlapping with the first cell and operating on a second carrier frequency. The method comprises broadcasting information comprising a cell reselection priority for each of the first and the second carrier frequencies in the first cell, wherein the cell reselection priority of the first carrier frequency is configured to be higher than the cell reselection priority of the second carrier frequency. The method also comprises broadcasting information comprising a cell reselection priority for each of the first and the second carrier frequencies in the second cell, wherein the cell reselection priority of the second carrier frequency is configured to be higher than the cell reselection priority of the first carrier frequency. This is done such that at least one user equipment camping on the first or the second cell will primarily perform intra-frequency cell reselection based on the broadcasted information.

In accordance with a second embodiment, a radio network node of a radio communications system operating on multiple carrier frequencies, adapted to constrain cell reselection of a user equipment to intra-frequency cell reselection is provided. The radio network node is adapted to host a first cell operating on a first carrier frequency and a second cell overlapping with the first cell and operating on a second carrier frequency. The radio network node comprises a first transmitter adapted to broadcast information comprising a cell reselection priority for each of the first and the second carrier frequencies in the first cell, wherein the cell reselection priority of the first carrier frequency is configured to be higher than the cell reselection priority of the second carrier frequency. The radio network node also comprises a second transmitter adapted to broadcast information comprising a cell reselection priority for each of the first and the second carrier frequencies in the second cell, wherein the cell reselection priority of the second carrier frequency is configured to be higher than the cell reselection priority of the first carrier frequency. Thereby a user equipment camping on the first or the second cell will primarily perform intra-frequency cell reselection based on the broadcasted information.

An advantage of embodiments is that the UE distribution achieved in connected mode to a large degree is preserved when UEs are released to idle mode. UEs that are frequently shifting between connected mode and idle mode may therefore be expected to reappear on the carrier frequency where they were last released each time they enter connected mode. The need for recurring inter-frequency handover to correct traffic load imbalance caused by inter-frequency mobility in idle mode is therefore reduced, and the signaling load in the network is generally reduced. Furthermore, UEs in connected mode are less affected by handover procedures, which may cause disturbance of service.

Other objects, advantages and features of embodiments will be explained in the following detailed description when considered in conjunction with the accompanying drawings and claims.

BRIEF DESCRIPTION OF THE DRAWINGS

FIG. 3 is a schematic illustration of a managed object model.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the embodiments are primarily described in the form of a method and a node, they may also be embodied in a computer program product as well as in a system comprising a computer processor and a memory coupled to the processor, wherein the memory is encoded with one or more programs that may perform the functions disclosed herein.

Figure 1A:
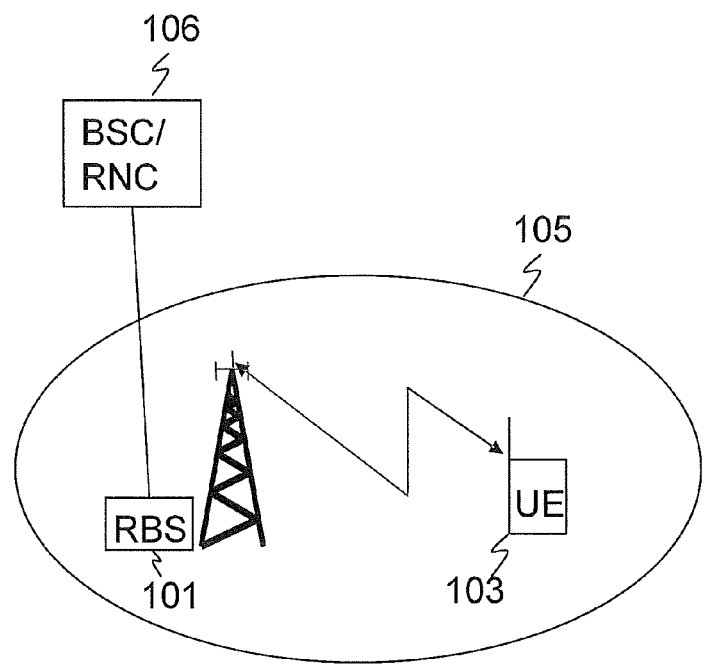
FIGS. 1a and 1b are schematic illustrations of radio access networks.
Figure 1B:
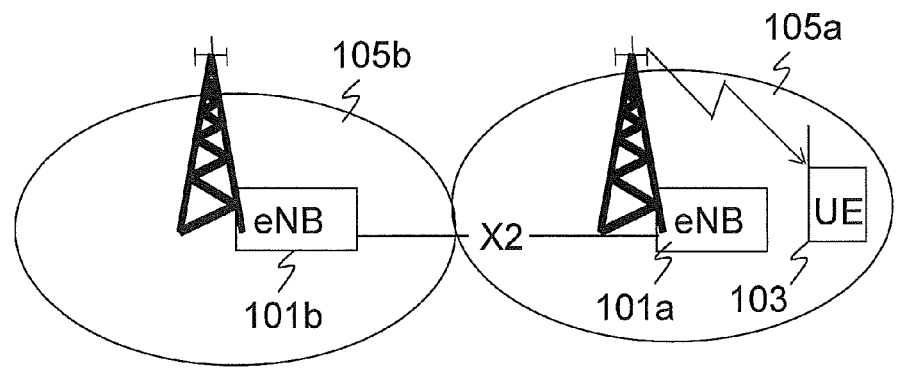
Figure 2A:
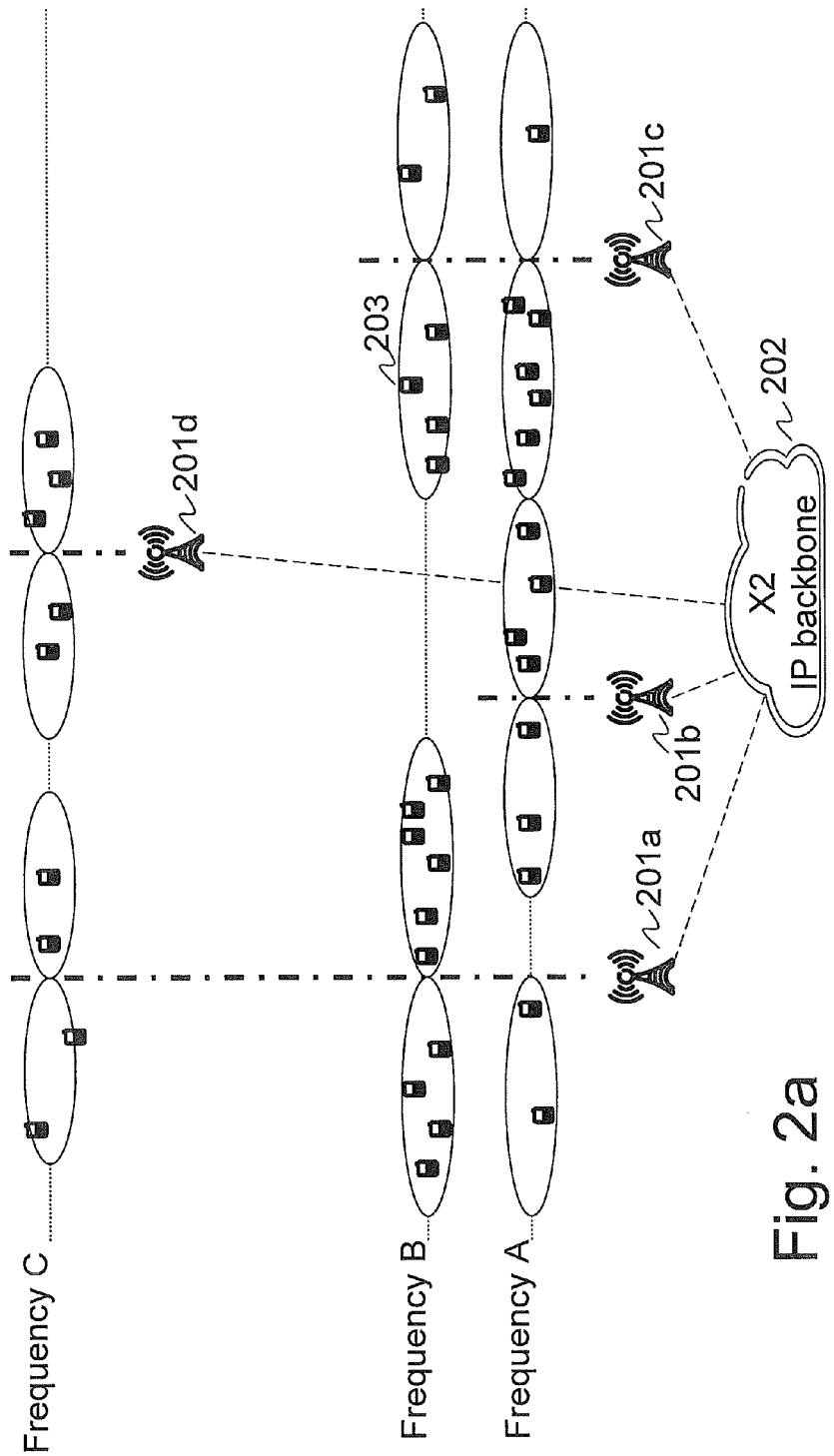
FIG. 2a is a schematic illustration of a multi-carrier radio access network.

Embodiments are described in a non-limiting general context in relation to an example scenario with a multi-carrier E-UTRAN, such as the network scenario illustrated in FIG. 2a with three carrier-frequencies A, B, and C. However, it should be noted that the embodiments may be applied to any radio access network technology, such as UTRAN or GSM, with mobility mechanisms similar to those in an E-UTRAN. Furthermore the radio access network may have two or more carrier frequencies belonging to the same or different frequency bands.

Traffic load balancing in a large mobile telephone network with multiple carrier frequencies is a complex task. The traffic the UEs generate is random in time and intensity. The UE mobility between cells and carrier frequencies due to UEs roaming in the network is also random to a certain degree. Depending on the network topology, i.e. where cells are deployed on the different carrier frequencies and what area they cover, the network needs to deploy a strategy for how to spread the UEs between the available carrier frequencies in a given area.

The end-user performance, especially for mobile broadband users, is highly dependent on the capacity or data bandwidth the network can offer to the users when connecting to the Internet. It is a general expectation that spreading the UEs between the available carrier frequencies in proportion to the network capacity of each carrier is beneficial for the end-user performance. It should ensure that each user is able to receive a fair share of the totally available network capacity.

With the method described herein, redistribution of UEs to handle the load balancing is performed mainly with handover of UEs in connected mode between the alternative carrier frequencies, guided by traffic load assessments performed in each cell. The method used for load balancing aims at equalizing the subscription ratio of cells on different carrier frequencies sharing coverage. The subscription ratio is a value reflecting the amount of active users in a cell in relation to the total capacity the cell can offer. This is a relevant measure, especially for mobile broadband with users who are effectively sharing a common pool of network capacity in the cell. Such users have no Guaranteed Bit Rate (GBR), and are hereinafter called non-GBR users.

The grade of service the network can offer to each UE is heavily dependent on the share of network capacity the end-user can expect. Distributing UEs evenly between the cells covering a certain area means that the grade of service is predictable and does not depend on a random distribution of the UEs between the carrier frequencies.

The general purpose of the techniques described in detail below is to facilitate a control of the distribution of UEs between the carrier frequencies available in a mobile telephone network, such that the traffic load is balanced in proportion to the available capacity on each carrier frequency. It is desirable that the UEs at a certain location are distributed between the available carrier frequencies in a way such that the traffic load they generate is proportional to the capacity the network can offer on each carrier frequency. For that purpose, the network applies a traffic load balancing policy. It may include a combination of both inter-frequency mobility procedures in connected mode and the mechanisms available to influence cell reselection in idle mode.

UEs do not generate traffic load in idle mode. Nevertheless, when a UE attempts to enter connected mode, i.e. to establish an RRC connection, it attempts to do that in the cell where it is camped in idle mode. Hence, maintaining the UE distribution in idle mode is essential, because it reduces the need for corrective mobility measures such as inter-frequency handovers after an RRC connection establishment. One way to maintain a UE distribution in idle mode is to let the eNB assign dedicated cell reselection priorities to specific UEs when they are released. Dedicated priorities override the absolute cell reselection priorities the UE receives via system information and could be a way to keep the UEs at a desired carrier frequency. However, this solution has not been used in embodiments of the invention.

An underlying assumption is that the mobility procedures in the network can be divided in three main categories:
1. Normal UE mobility, which is handled primarily with intra-frequency mobility procedures, illustrated in FIG. 2b, comprising handover and/or cell reselection. As long as there is sufficient coverage, UEs are roaming from cell to cell at the current frequency, aiming at the best cell from coverage and interference perspective.
2. In order to avoid bad coverage, inter-frequency mobility procedures, illustrated in FIG. 2c, comprising handover and/or cell reselection, are used where the coverage at a certain carrier frequency drops below the acceptable level.
3. Traffic load balancing, performed with inter-frequency mobility procedures, illustrated in FIG. 2d, comprising handover and/or redirection at RRC connection release. These are based on traffic load assessments in overlapping cells on alternative carrier frequencies, aiming at equalizing the traffic load between those cells.

The overall load balancing policy is based on the assumption that normal UE mobility due to UE roaming is handled primarily with intra-frequency mobility procedures. Inter-frequency mobility due to roaming is used mainly to handle bad coverage, when UEs are roaming out of the coverage of the current carrier frequency. Additional inter-frequency mobility is applied to equalize the traffic load imbalance that may occur due to random mobility of the first two kinds and due to the stochastic variation of UE activities over time.

As the network controls the mobility procedures in connected mode, the network can manage all three categories of mobility procedures for UEs in connected mode. The mobility procedures for normal UE mobility and for avoiding bad coverage are carried out based on radio link measurements. Usually, the UE performs these measurements and report to the network. However, radio link measurements can also be performed in the RBS. The mobility procedures for traffic load balancing are carried out based on traffic load assessments in the network.

For UEs in idle mode, the network does not have direct control of the mobility procedures. The UEs perform autonomous cell reselection based on radio link measurements and on the requirements for cell reselection defined in the standard. The network can only indirectly influence the cell reselections that the UEs perform.

According to one embodiment, an E-UTRAN involving several aspects is provided, including the assessment of traffic load in each cell, the exchange of this information between the eNBs hosting the cells, a controlled redistribution of the UEs between the available carrier frequencies according to the capacity of each carrier frequency, and preservation of the UE distribution when UEs are released to idle mode where they perform autonomous cell reselection.

The E-UTRAN consists of a large numbers of eNBs. Each eNB is hosting one or more cells, pointing in different directions and/or located on different carrier frequencies. E-UTRAN capable UEs are roaming into the E-UTRAN and connect to the network via a selected cell. FIG. 2a shows a schematic deployment of an E-UTRAN on three carrier frequencies A, B and C. The eNBs 201a-d are interconnected via a back-bone IP transport network 202, through which they may exchange information on basis of the X2 application protocol. The eNBs 201a-d are also connected via the IP transport network to an Evolved Packet Core (EPC), comprising the Packet Gateway providing the UEs 203 with end-to-end IP services.

In order to obtain end-to-end services from the network, a UE establishes one or more Evolved Packet System (EPS) bearers to the Packet Gateway. The EPS bearer concept includes Quality of Service profiles:
  GBR type of EPS bearers, with a guaranteed minimum bit rate; and
  Non-GBR type of EPS bearers, which provide best effort service without a guaranteed bit rate.
A range of both GBR and non-GBR types of EPS bearers are supported in the E-UTRAN.

On the radio interface, the eNBs control the UEs with the RRC protocol. When the UE has entered RRC connected mode, the eNB controls the mobility of the UE from one cell to another within the network. The eNB configures the UE to perform measurements on the serving cell and on neighboring cells, on the serving carrier frequency and possibly on the alternative carrier frequencies in the network. The UE sends reports with the results of these measurements to the eNB. The eNB uses these results to determine when the UE should be moved to another cell. Moving the UE from one cell to another in connected mode is performed with a handover procedure. The configuration of the UE measurements, measurement reporting and handover are all procedures specified in the 3GPP technical specifications (e.g., 3GPP TS 36.300 V10.3.0 section 10, 36.133 V10.2.0 section 5, 36.331 V10.1.0 sections 5.3.5, 5.5, and 36.423 V10.1.0, section 8.2).

When a UE is idling for some time, i.e. when it is not transmitting or receiving any data, the eNB releases the RRC connection and the UE enters RRC idle mode. In RRC idle mode, the UE performs autonomous cell reselection according to specified criteria. In RRC idle mode, the eNB has only indirect control of the movements of the UE. The eNB sends out system information in each cell comprising parameters for the evaluation of cell reselection criteria. The system information is part of the RRC protocol.

The techniques disclosed in this document focus on the problem of preserving the distribution of UEs between carrier frequencies when the UEs are released to idle mode. A desired UE distribution is achieved with inter-frequency mobility procedures in connected mode, or possibly at the transition from connected to idle mode. The desired UE behavior in idle mode is usually to stay on the carrier frequency where it is released.

The disclosed techniques make use of the cell reselection priorities assigned to each carrier frequency and signaled to the UEs via system information in each cell. In particular, embodiments involve an arrangement where the cells on each carrier frequency indicates a cell reselection priority of the own carrier frequency which is strictly greater than the cell reselection priority indicated for any alternative carrier frequencies within the network area. In this way, unrestricted intra-frequency cell reselection is facilitated, while inter-frequency cell reselection is restricted. Inter-frequency cell reselection is possible only when it is required for bad coverage reasons.

Embodiments are applied in a technical context where the network nodes, e.g. the eNBs in E-UTRAN, perform assessments of the traffic load in each cell and exchange this information according to a set of established neighbor cell relations between the carrier frequencies. The network nodes use this information to determine load balancing actions in terms of handover and/or redirection of selected UEs between the carrier frequencies in a controlled manner. This is done in order to achieve a balanced distribution of UEs in connected mode between the set of carrier frequencies.

Assessment of Traffic Load in Each Cell

For the purpose of traffic load balancing, the eNBs perform an assessment of the traffic load in each cell. The traffic load in each cell is quantified using a subscription ratio value. The subscription ratio is the quotient between an aggregation of the subscription cost of all the active UEs in the cell and an assumed subscription capacity of the cell. The subscription cost of a UE is determined based on the quality of service profiles of the EPS bearers the UE has established. For a GBR bearer, a configured value in the quality of service profile, or alternatively the guaranteed minimum bit rate of the GBR bearer, may be used as the subscription cost. For a non-GBR bearer, the subscription cost is typically a configured value in the quality of service profile, which could be based on the bit rate considered as the minimum bit rate that is satisfactory for the specific type of non-GBR bearer.

The aggregation of subscription costs in the cell can be performed including all the UEs in RRC connected mode. However, a UE is often idling for quite some time, up to a few minutes, before it is released to idle mode. Therefore, it may be preferable to restrict the aggregation to those UEs, or EPS bearers, having actively received or transmitted data during the last period of time, where the time window for the aggregation is configurable to a value of a few seconds.

The assumed subscription capacity of the cell can be a configurable value for each cell. Alternatively, the eNB could apply an algorithm for self-tuning the subscription capacity, wherein the tuning of the assumed subscription capacity is based on observations of, for instance, the physical radio resource utilization in the cell and the correspondingly obtained aggregate bit rate in the cell.

In one embodiment, the calculation of the subscription ratio (subscrRatio) includes all the EPS bearers the UEs have established. In this case, it can be described with the following equation:

$$subscrRatio = \frac{\sum_{non\text{-}GBR} bearerSubscrCost + \sum_{GBR} bearerSubscrCost}{cellSubscrCapacity} \quad [1]$$

In many cases, however, the GBR type of EPS bearers is only admitted into the cell up to a certain level, in order to ensure there is sufficient capacity. A GBR bearer requires a guaranteed minimum bit rate. If too many were admitted, starvation could occur in the cell. Given that the maximum amount of GBR bearers is quantified, the traffic load balancing may focus on the remaining cell capacity available for non-GBR bearers.

Therefore, in an alternative embodiment, the calculation of the subscription ratio focus on the non-GBR type of EPS bearers and the cell subscription capacity available for those, considering the subscription capacity that the GBR bearers currently occupy. In this case, the subscription ratio can be described with the following equation:

$$subscrRatio = \frac{\sum_{non\text{-}GBR} bearerSubscrCost}{cellSubscrCapacity - \sum_{GBR} bearerSubscrCost} \quad [2]$$

In both of these embodiments where the subscription ratio is described according to equation [1] and [2], the eNB calculates the subscription ratio of each cell.

There are also other quantities that could be used for traffic load assessment, either as a complement to the subscription ratio, or as an alternative. Examples of such quantities are:
1. The radio resource utilization in the cell, which in an E-UTRAN typically is the physical resource block (PRB) utilization;
2. Data throughput or data buffering queue sizes;
3. The total transmitted output power in the cell.

Different techniques for traffic load assessment may be applicable depending on the type of RAT used.

In embodiments, the subscription ratio is used to quantify the traffic load in the cell.

Exchange of Traffic Load Information

In embodiments, configuration data for the network is stored in a data base, organized according to a Managed Object Model (MOM). The various entities in the network are represented in the data base as Managed Objects (MO). Configuration data for these entities is stored as attributes to the corresponding MO class. Different MO classes are used for the different kinds of network entities or elements.

According to the MOM, MO classes are defined to represent network entities like a cell or a carrier frequency, and also to represent equipment elements like an eNB or parts therein. Associated with those, there are also MO classes representing relations, for instance, between a cell and the carrier frequencies in the area and the neighboring cells located on those carrier frequencies.

The relevant part of the data base is stored in each eNB. That includes the MOs representing the cells the eNB hosts, the MOs representing network relations relevant for those cells, and also MOs representing external network entities, like for instance MOs characterizing the neighboring cells on other eNBs.

FIG. 3 schematically illustrates an extract of the MOM data base where a first cell (Cell 1) has a cell relation with a neighboring second cell (Cell 2). An MO Cell 1 in the MOM data base is representing Cell 1. The MO includes numerous attributes to characterize the cell. A few attributes have been indicated in FIG. 3. Attached to the MO Cell 1, there is a set of MO FreqRelation, i.e. one or many relations, each one representing a carrier frequency in the area. Attached to those are the MO CellRelation (null or many), each representing a cell relation the Cell 1 has on that carrier frequency. The MO CellRelation provides a reference to the MO Cell 2, representing the neighboring second cell (Cell 2). The MO CellRelation also includes attributes to characterize a possible load balancing relation that Cell 1 has with Cell 2. The set of attributes includes attributes for activation and deactivation of the load balancing relation and attributes to characterize the load balancing actions Cell 1 performs towards Cell 2.

The MOs representing the cell relations of a particular cell with its neighbors are established either by explicit configuration, i.e., entered into the data base on explicit command from the operator or from the configuration tools the operator is using, or by internal procedures for self-organization performed by the eNBs in the network, guided by measurements and observations the eNBs receive from the UEs.

Figure 4:
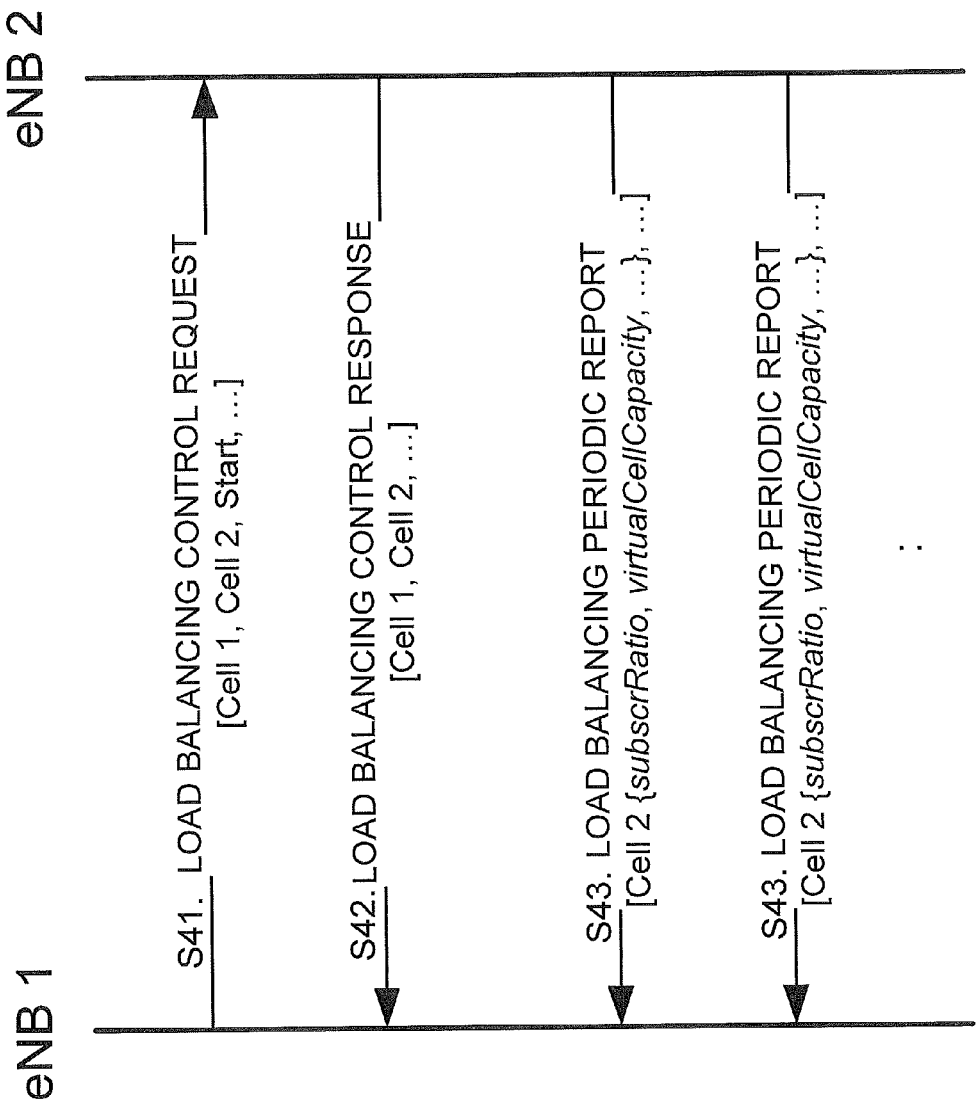
FIG. 4 is a signaling diagram illustrating a load balancing signaling sequence.

When a load balancing relation is activated, the eNB (eNB1) hosting Cell 1 requests the eNB (eNB2) hosting Cell 2 to start sharing traffic load information regarding Cell 2 with Cell 1 in eNB1, where the load balancing relation originates. The eNB2 then begins to send periodic reports including the subscription ratio of Cell 2 to eNB1. FIG. 4 schematically illustrates the signaling sequence where eNB1 activates the load balancing relation originating in Cell 1 towards Cell 2, with the request in S41. eNB2 acknowledges the request with a response in S42.

The load balancing relation can be unidirectional, i.e., Cell 1 performing load balancing towards Cell 2, but Cell 2 does not in the other direction. However, normally, the load balancing is bidirectional, i.e., eNB2 activates a corresponding load balancing relation that is configured in Cell 2 towards Cell 1.

The periodic report transmitted from eNB2 to eNB1 in S43 in FIG. 4 includes the subscription ratio of Cell 2. It may also include the denominator value from the calculation of the subscription ratio (virtualCellCapacity) and possibly other attributes required for the load balancing function. The denominator value is used to moderate the UE redistribution rate on the cell relation in relation to the relative capacity of the two cells. Possible other attributes could, for instance, reflect the presence of load balancing relations between Cell 2 and other cells in addition to Cell 1, which may be necessary to take into consideration in Cell 1 when moderating the UE redistribution rate towards cell 2.

Using the same procedure, it is possible for a cell to establish load balancing relations with any number of neighboring cells and periodically receive information about the current subscription ratio in those. Load balancing relations are established between cells located on different carrier frequencies, or physically separated in other ways with overlapping coverage. Such cells are hence capable to share traffic load in the overlapping area.

When a load balancing relation is established, it may be two separate eNBs hosting the two cells, as described above with reference to FIGS. 3 and 4. In this case, the signaling required to activate the load balancing relation and to send periodic reports with information about the subscription ratio is carried out on basis of the signaling procedures and messages defined in the X2 Application Protocol, X2AP (3GPP TS 36.423 V10.1.0, sections 8.3.6, 8.3.7, 9.1.2.11-14, and, e.g., 9.2.44-47). It is assumed that all the eNBs are connected to an IP backbone network 202 as shown in FIG. 2a. The X2AP signaling is carried out via the IP backbone network.

In an alternative embodiment, the X2AP PRIVATE MESSAGE is used to convey non-standard signaling messages in order to carry out non-standard signaling procedures. The signaling procedure shown in FIG. 4 is using non-standard signaling messages S41, S42 and S43. However, similar procedures exist in X2AP using standard defined messages.

Non-standard signaling messages allow the message content to be more specifically adapted to a particular company or operator specific load balancing function. Non-standard signaling messages, on the other hand, restricts the interoperability between eNBs from different manufacturers.

In case it is the same eNB hosting the two cells involved in the load balancing relation, the activation of the load balancing relation and the periodic reports may be signaled on the X2 interface in essentially the same way as if two separate eNBs are hosting the two cells. Hence, in this case, the same eNB is acting both source and target in the X2 signaling procedures. Otherwise, the procedures are identical. In an alternative embodiment, these transactions are carried out via internal data transfers within the eNB, without involving the X2 interface and associated signaling procedures.

Redistribution of UEs Between Cells with Load Balancing Relation

When a first cell in a network employing the present techniques has an active load balancing relation with a second neighboring cell, the eNB hosting the first cell calculates the subscription ratio of the first cell ($sR_1$). The calculation is reevaluated periodically. The eNB also has information about the current virtual cell capacity of the first cell and possible scaling factors. The eNB hosting the first cell also receives periodic reports from the eNB hosting the second cell. These reports contain the subscription ratio of the second cell ($sR_2$). They also contain information about the current virtual cell capacity of the second cell and possible scaling factors.

Based on this information, if $sR_1$ is greater than $sR_2$, it is possible to make a selection of UEs to handover from the first cell to the second cell in order to even out the load difference between these two cells. The UEs should then be selected essentially based on the subscription cost, satisfying the equation:

$$\sum_{UE\ selection} bearerSubscrCost = (sR_1 - sR_2) \cdot \frac{vC_1 \cdot vC_2}{vC_1 + vC_2} \quad [3]$$

where $vC_1$ and $vC_2$ are the virtual capacity of the first and second cells respectively.

The selection criterion here is valid for the first embodiment of the subscription ratio described according to equation [1] above, with all the EPS bearers of the UEs included in the nominator. The criterion can be used also for the second embodiment of the subscription ratio described according to equation [2] above, with only non-GBR EPS bearers in the nominator. However, the result will then be more approximate. In either case, both the GBR and the non-GBR EPS bearers of the UEs are included in the "UE selection" aggregation.

With this kind of UE selection, a "dead beat" regulation may be achieved. If this is the only UE mobility in and out of the two cells and handover is performed on the entire UE selection, it should result in a complete equalization of the traffic load in the two cells. This kind of "dead beat" regulation may be possible if these two cells were the only cells involved in the load balancing process. However, in the general case, the two cells have both a number of other load balancing relations to consider.

For that reason, some embodiments of the presently disclosed techniques use a series of redistribution steps, where smaller portions of UEs are redistributed. Such smaller UE selections used for redistribution could be determined based on a downscaling of the selection criterion above. With a series of smaller redistributions, and a reevaluation of the criterion in each step, the load balancing process may eventually reach a balanced state, where the subscription ratios are essentially equal.

If the coverage of the cells is not the same, and the first cell is not entirely covered in the second cell, the UE selection process may need to include measurements that the UE performs on the second cell. This is necessary to ensure that the selected UEs have sufficient coverage in the target cell.

The redistribution is performed with the usual mobility procedures used in RRC connected mode. The RRC Connection Reconfiguration procedure with mobilityControlInfo is the main option to perform an inter-frequency handover of the UE, from one E-UTRAN cell to another cell on a different frequency. If the target cell belongs to a different RAT, the mobility procedure from E-UTRAN is the main option. Alternatively, the RRC Connection Release procedure with idleModeMobilityControlInfo can be used. In this case, the UE is released to idle mode and it has to re-establish the RRC connection in the target cell if it needs to continue the connection.

The application of load balancing relations, and the exchange of traffic load information between network entities, i.e. eNBs and cells, together with an active load balancing relation, is flexible. In a multi-carrier network, with a heterogeneous deployment of cells on the different carriers, each cell may have a large number of active load balancing relations with cells on alternative carrier frequencies where there is common coverage. In particular, a large cell on one carrier frequency may have multiple load balancing relations with cells on alternative carrier frequencies, cells that do not necessarily have mutual overlap. By shunting users via the larger cell, the flexibility of the inventive techniques described herein offers ways to perform a certain degree of load sharing also between cells without overlapping coverage.

The mobility procedures are used to modify the UE distribution in a controlled manner. Individual UEs are selected and redistributed when required in order to balance the traffic load. In order to have a sustained effect on the UE distribution also when UEs are released into idle mode, measures are required in idle mode to prevent the UEs to reselect back to the original cell and carrier frequency.

Preservation of the UE Distribution in Idle Mode

The preservation of UE distribution in idle mode ensures that the effect of the UE redistribution achieved in connected mode is sustained, when UEs are released to idle mode. The objective is to allow UEs to perform intra-frequency cell reselection, in order to camp on the best cell on the current frequency, and at the same time prevent the UEs to perform inter-frequency cell reselection, unless the reception of the current frequency is insufficient due to a bad coverage.

A system implementing the present techniques uses the, so called, absolute cell reselection priorities defined for the different E-UTRA carrier frequencies for the preservation of the idle mode distribution. Instead of using a strict priority ranking of the frequencies, the system information transmitted in each cell promotes the absolute cell reselection priority of the own frequency, such that it is strictly greater than the absolute priority indicated for the alternative carrier frequencies. In this way, the UE always perceives an inter-frequency or inter-RAT cell reselection as a reselection towards a frequency or RAT of a lower priority, irrespective of which frequency the UE is currently camped on.

The UE is allowed to perform cell reselection towards a frequency of lower priority only if the cell selection criterion of the serving cell falls below a certain threshold, i.e., when the reception quality of the current frequency is no longer good enough. The parameter threshServingLow in the system information is used to set a threshold in that respect for the cell selection criterion in the serving cell.

The basic concept can be illustrated with a simple example, based on three E-UTRAN carrier frequencies A, B and C. The cell reselection priorities for these frequencies, given in a scale from 0 to 7, as indicated in the system information of the cells located on the different carrier frequencies, are given in the following table:

TABLE 1

Examples of cell reselection priorities broadcasted in system information

| Cell reselection priority indicated . . . | . . . to frequency A | . . . to frequency B | . . . to frequency C |
|---|---|---|---|
| . . . in a cell on frequency A | 6 | 4 | 3 |
| . . . in a cell on frequency B | 3 | 6 | 4 |
| . . . in a cell on frequency C | 3 | 4 | 6 |

As illustrated in this example, when the UE camps on a cell on one of these frequencies A-C, the indicated cell reselection priority of the current frequency is always greater than the indicated cell reselection priority for any of the alternative frequencies.

For example, a UE camping on frequency B reads the system information and perceives a cell reselection priority of frequency B equal to 6, a cell reselection priority of frequency C equal to 4, and a cell reselection priority of frequency A equal to 3. As long as the cell selection criterion is above the threshold set by parameter threshServingLow, indicating that the reception quality of frequency B is good enough, the UE stays on frequency B. Furthermore, the UE is restricted to intra-frequency cell reselection to handle roaming. Only when the cell selection criterion goes below the threshold, typically due to bad coverage, the UE may perform inter-frequency cell reselection to frequency C or A.

Figure 2B:
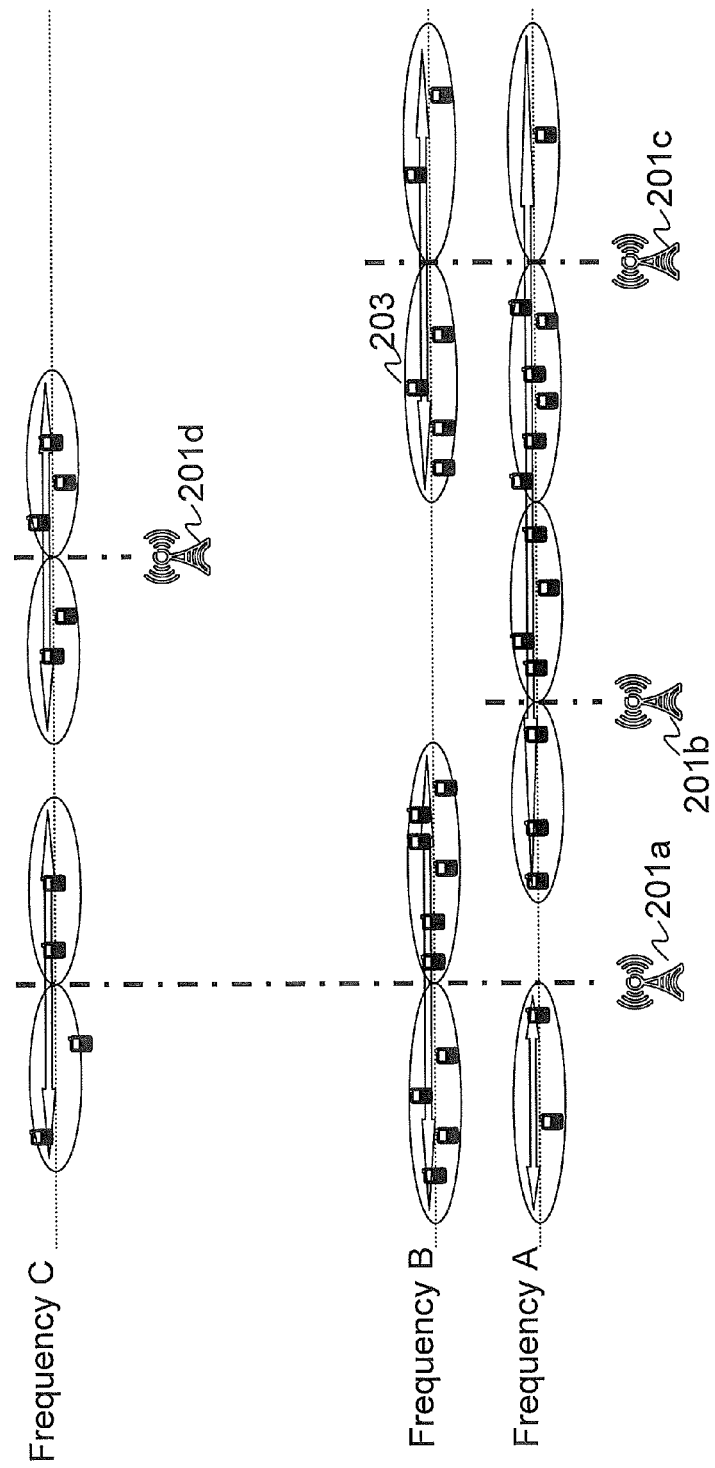
FIG. 2b is a schematic illustration of intra-frequency handover or cell reselection.

In the same way, UEs camping on frequency A or C read the system information on those frequencies and perceive a cell reselection priority of the own frequency greater than the cell reselection priority of the alternative frequencies. FIG. 2b illustrates normal UE mobility (see arrows within the cells) in a multi-carrier network configured according to the table above. The UEs performs intra-frequency cell reselection without constrain, as long as they stay within coverage of the current frequency.

Figure 2C:
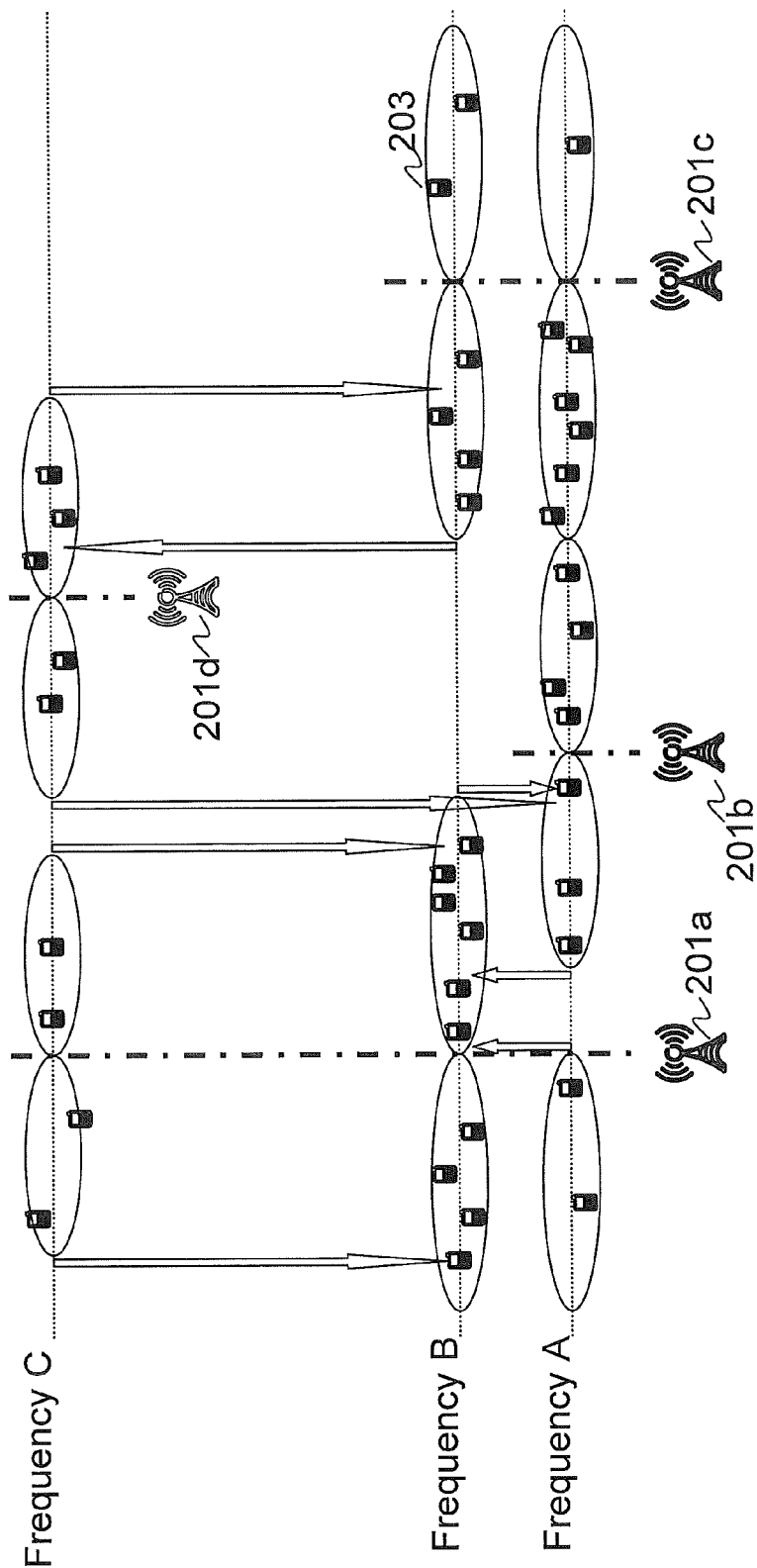
FIG. 2c is a schematic illustration of inter-frequency handover or cell reselection due to bad coverage.

FIG. 2c illustrates the bad coverage related inter-frequency cell reselections that occurs where the coverage is no longer good enough, i.e., the measured signal strength (RSRP), or signal quality (RSRQ), falls below the threshold set by parameter threshServingLow.

At bad coverage, the UE performs inter-frequency cell reselection to an alternative carrier frequency, based on the cell reselection priorities it has received for those carrier frequencies, and also parameters specifying minimum reception qualities for those frequencies.

Figure 2D:
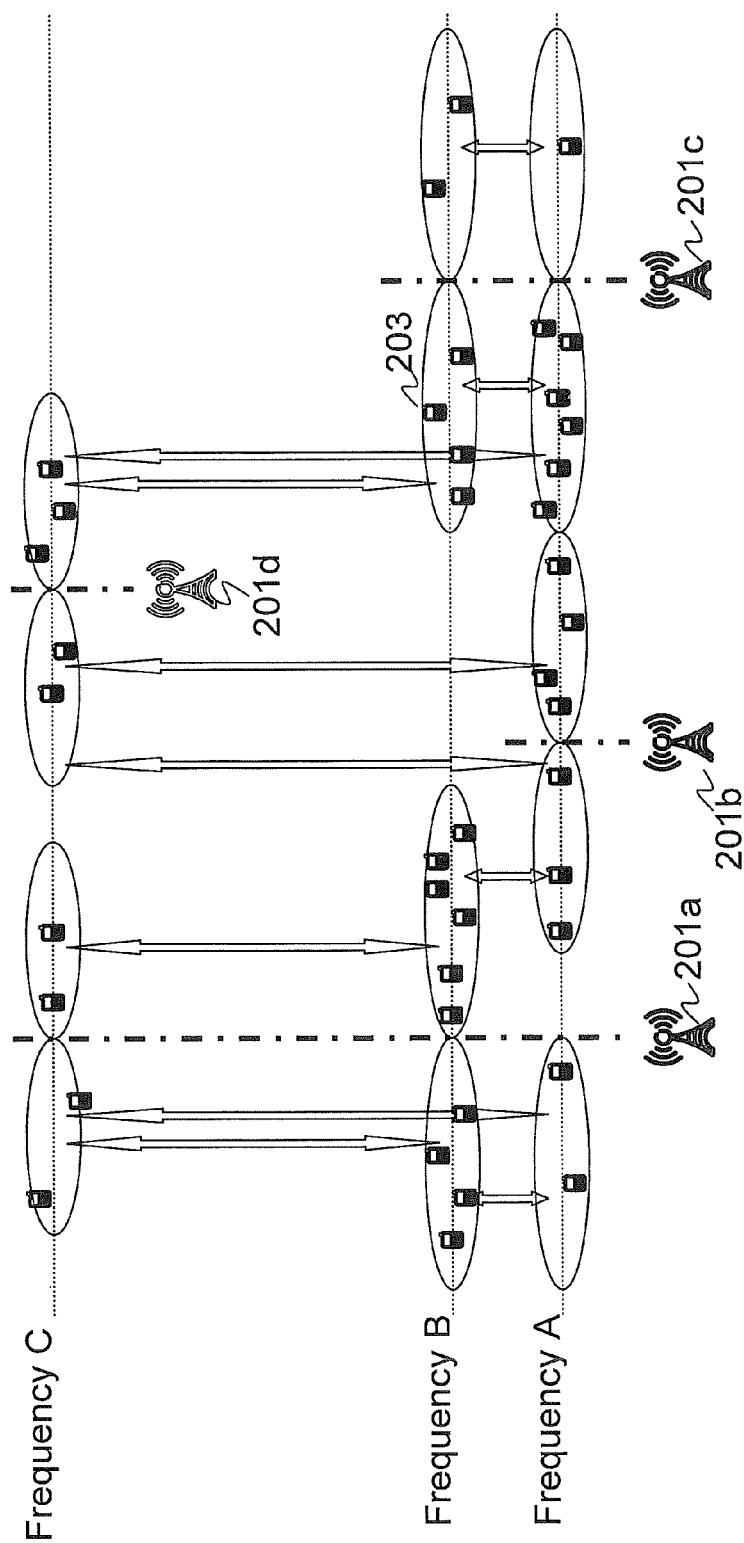
FIG. 2d is a schematic illustration of inter-frequency handover or redirection due to traffic load balancing.

In this way, an inherent stability is achieved in the distribution of UEs between the frequencies. The UEs tend to stay on the frequencies where they are camped. Cell reselection between the cells on the same frequency proceeds as normal. The imbalance of traffic load that may occur is corrected with UE redistribution in connected mode, as shown in FIG. 2d and described in the section called "Redistribution of UEs between cells with load balancing relation" above.

The process is governed by parameters the UE receives from the network via system information, as part of the RRC protocol specified in the. System information messages are received on the Broadcast Control Channel (BCCH) present in each cell. These messages contain System Information Blocks (SIB) of different types with the actual system information for the UE (3GPP TS 36.331 V10.1.0 section 6.3.1).

In the SystemInformationBlockType3 (SIB3), the eNB transmits the information field cellReselectionServingFreqInfo to the UEs camped on the cell, described as follows:

```
cellReselectionServingFreqInfo  SEQUENCE {
    s-NonIntraSearch       ReselectionThreshold   OPTIONAL,
    threshServingLow       ReselectionThreshold,
    cellReselectionPriority  CellReselectionPriority
}
```

The parameters s-NonIntraSearch and threshServingLow are used to ensure that the UE may reselect another carrier frequency if the reception of the serving frequency, i.e., the carrier frequency serving the current cell, is not good enough. The parameter cellReselectionPriority is used to indicate the cell reselection priority of the serving frequency.

In the SystemInformationBlockType5 (SIB5), the eNB transmits the information field cellReselectionServingFreqInfo to the UEs camped on the cell:

```
InterFreqCarrierFreqInfo ::=  SEQUENCE {
    dl-CarrierFreq           ARFCN-ValueEUTRA,
    q-RxLevMin               Q-RxLevMin,
    p-Max                    P-Max                  OPTIONAL,
    t-ReselectionEUTRA       T-Reselection,
    t-ReselectionEUTRA-SF    SpeedStateScaleFactors OPTIONAL,
    threshX-High             ReselectionThreshold,
    threshX-Low              ReselectionThreshold,
    allowedMeasBandwidth     AllowedMeasBandwidth,
    presenceAntennaPort1     PresenceAntennaPort1,
    cellReselectionPriority  CellReselectionPriority OPTIONAL,
    neighCellConfig          NeighCellConfig,
    q-OffsetFreq             Q-OffsetRange          DEFAULT dB0,
    interFregNeighCellList   InterFregNeighCellList OPTIONAL,
    interFreqBlackCellList   InterFreqBlackCellList OPTIONAL,
    ...
}
```

In SIB5, the parameter dl-CarrierFreq is used to indicate a channel number, i.e. the Absolute Radio Frequency Channel Number (ARFCN) of an alternative neighbor carrier frequency. The parameter cellReselectionPriority is used to indicate the cell reselection priority of the neighbor frequency.

Similarly, in SIB6, SIB7 and SIB8, the eNB may transmit information fields containing information about the neighbor carrier frequencies and the corresponding cell reselection priorities in possible UTRAN (WCDMA), GSM and/or CDMA2000 mobile telephone networks in the area.

The UE in idle mode utilizes this information in the cell reselection process. In general, if the UE detects a carrier frequency (E-UTRAN, UTRAN, GSM or CDMA2000) of higher priority than the serving frequency, and that carrier frequency satisfies certain reception criteria, such as the cell selection criteria exceeding threshX-High, the UE reselects a cell on that carrier frequency.

If the UE detects a carrier frequency of equal priority to the serving frequency, the UE reselects a cell on the carrier frequency with the better, e.g. stronger, signal level.

If the UE detects a neighbor carrier frequency of lower priority than the serving frequency, a reselection of a cell on a carrier frequency of lower priority is performed if the cell selection criteria of the serving frequency is below the threshold determined by the parameter threshServingLow in SIB3, the neighbor carrier frequency satisfies certain reception criteria, such as a cell selection criteria exceeding threshX-Low, and there are no better alternatives.

One aspect of the techniques described herein is that the eNB, in each cell, indicates a cell reselection priority of the serving carrier frequency in SIB3 that is strictly higher than the cell reselection priorities of any neighboring carrier frequency indicated in SIB5, SIB6, SIB7 and/or SIB8. Any alternative carrier frequency in E-UTRA or another RAT is in this way treated as a carrier frequency of lower priority, which prevents reselection of a cell on those frequencies as long as the reception of the serving frequency is good enough, i.e. when it is better than the threshold parameter threshServingLow in SIB3 indicates.

This aspect stabilizes the UE distribution between alternative carrier frequencies when the UEs are in idle mode. The UEs reselect between neighbor frequencies only when it is necessary, in order to handle bad coverage situations.

Methods and Nodes

Accordingly, embodiments of the inventive techniques disclosed herein include:

1. Networks, consisting of eNB equipment in E-UTRA, RBS, RNC or equivalent equipment in other RATs configured to constrain cell reselection primarily to intra-frequency cell reselection; and
2. Methods preserving the distribution of UEs in idle mode based on those configurations.

The UEs perform cell reselection according to 3GPP standards requirements and are not, in that sense, directly affected by the techniques disclosed herein.

Figure 5A:
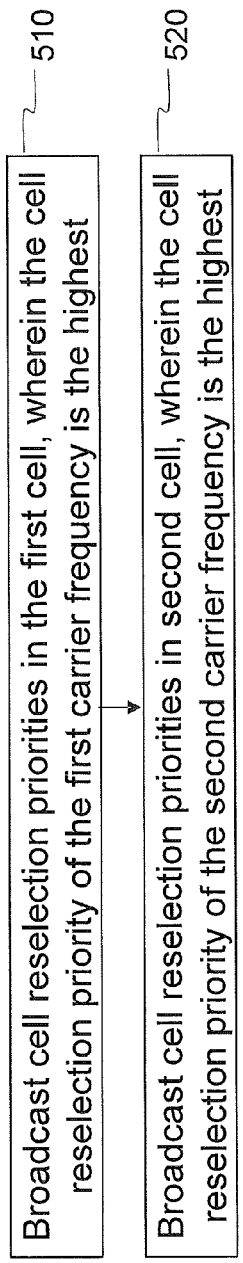
FIGS. 5a-b are flowcharts illustrating the method in a radio network node according to embodiments.

FIG. 5a is a flowchart illustrating a first embodiment of a method in a radio network node of a radio communications system operating on multiple carrier frequencies, for constraining cell reselection of a UE to intra-frequency cell reselection. The radio network node hosts a first cell operating on a first carrier frequency and a second cell overlapping with the first cell and operating on a second carrier frequency. However, additional overlapping cells operating on other carrier frequencies may also be hosted by the radio network node. In embodiments, the radio network node is a radio base station. In the examples described previously, the radio network node is an eNB in an E-UTRAN. However, alternatively the radio network node is a radio control node, such as the RNC in UTRAN or the BSC in GSM. The method comprises:

510: Broadcasting information comprising a cell reselection priority for each of the first and the second carrier frequency in the first cell. The cell reselection priority of the first carrier frequency is configured to be higher than the cell reselection priority of the second carrier frequency.

520: Broadcasting information comprising a cell reselection priority for each of the first and the second carrier frequency in the second cell. The cell reselection priority of the second carrier frequency is configured to be higher than the cell reselection priority of the first carrier frequency.

In this way, a UE camping on the first or the second cell will primarily perform intra-frequency cell reselection based on the broadcasted information.

In one embodiment, the information broadcasted in the first cell further comprises a threshold indicating a minimum reception quality for the first carrier frequency, and/or a threshold indicating a minimum reception quality for the second carrier frequency. Similarly, the information broadcasted in the second cell may further comprise a threshold indicating a minimum reception quality for the first carrier frequency, and/or a threshold indicating a minimum reception quality for the second carrier frequency. As already explained above, the different thresholds are used to ascertain that the intra-frequency cell reselection does not result in e.g. a too low reception quality. The UE is e.g. allowed to perform cell reselection towards a frequency of lower priority if the cell selection criterion of the serving cell falls below a threshold, i.e., when the reception quality of the current frequency is no longer good enough.

Figure 5B:
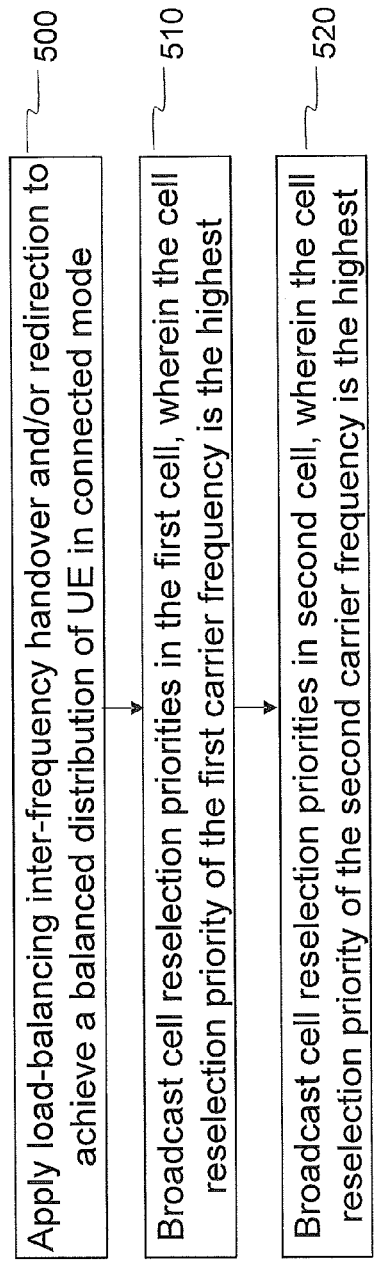

FIG. 5b is a flowchart illustrating a second embodiment of the method in the radio network node. The method comprises in addition to steps 510 and 520 of broadcasting cell reselection priorities to idle mode UEs:

500: Applying load-balancing inter-frequency handover and/or redirection to achieve a balanced distribution of user equipment in connected mode in the first and the second cell.

Figure 7:
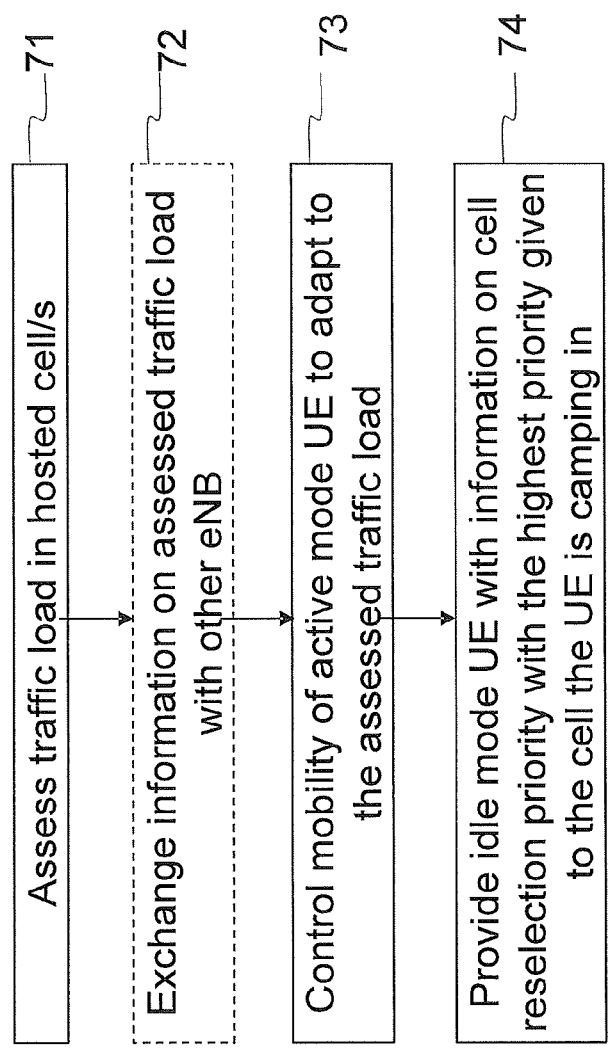
FIG. 7 is a flowchart illustrating the method in a radio network node according to embodiments.

The load balancing achieved by controlling handover and/or redirection of UEs in connected mode has been thoroughly explained above. FIG. 7 and the corresponding description given below further details the load balancing procedure used.

Figure 6:
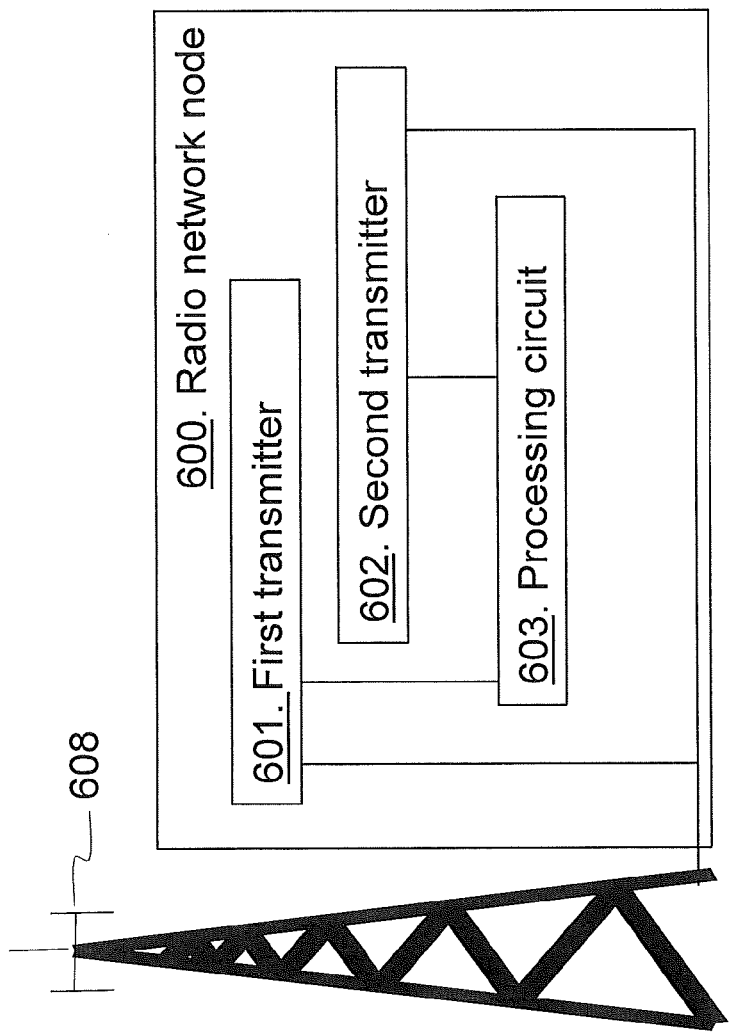
FIG. 6 is a block diagram schematically illustrating a radio network node according to embodiments.

An embodiment of a radio network node 600 of a radio communications system operating on multiple carrier frequencies, adapted to constrain cell reselection of a UE to intra-frequency cell reselection, is schematically illustrated in the block diagram in FIG. 6. In one embodiment, the radio network node is a radio base station 101, 600, such as an eNB in E-UTRAN. The radio network node 600 is adapted to host a first cell operating on a first carrier frequency and a second cell overlapping with the first cell and operating on a second carrier frequency. The radio network node comprises a first transmitter 601 adapted to broadcast information comprising a cell reselection priority for each of the first and the second carrier frequency in the first cell. The cell reselection priority of the first carrier frequency is configured to be higher than the cell reselection priority of the second carrier frequency. The radio network node also comprises a second transmitter 602 adapted to broadcast information comprising a cell reselection priority for each of the first and the second carrier frequency in the second cell. In this case, the cell reselection priority of the second carrier frequency is configured to be higher than the cell reselection priority of the first carrier frequency. Thereby, a UE camping on the first or the second cell will primarily perform intra-frequency cell reselection based on the broadcasted information. The first and the second transmitter, 601, 602, may be connected via an antenna port to a same or to different transmitting antennas 608.

In embodiments, the first transmitter 601 is adapted to broadcast information in the first cell further comprising a threshold indicating a minimum reception quality for the first carrier frequency, and/or a threshold indicating a minimum reception quality for the second carrier frequency. The second transmitter 602 may be adapted to broadcast information in the second cell further comprising a threshold indicating a minimum reception quality for the first carrier frequency, and/or a threshold indicating a minimum reception quality for the second carrier frequency.

Alternatively the radio network node is a radio control node 106, 600, typically controlling the operation of plural radio base stations 103, such as the RNC in UTRAN or the BSC in GSM. In this alternative embodiment the radio control node 106, 600 comprise the first and second transmitter 601, 602 that are connected to a radio base station 101. The radio control node 106, 600, is adapted to broadcast information comprising cell reselection parameters via first and second transmitter 601, 601, and via a radio base station 101 in a first and a second cell hosted by the radio base station.

In an embodiment corresponding to the second embodiment described above with reference to FIG. 5b, the radio network node further comprises a processing circuit 603 adapted to apply load-balancing inter-frequency handover and/or redirection to achieve a balanced distribution of user equipment in connected mode in the first and the second cell.

In an alternative way to describe the embodiment in FIG. 6, the radio network node 600 comprises a Central Processing Unit (CPU) which may be a single unit or a plurality of units. Furthermore, the radio network node 600 comprises at least one computer program product (CPP) in the form of a non-volatile memory, e.g. an EEPROM (Electrically Erasable Programmable Read-Only Memory), a flash memory or a disk drive. The CPP comprises a computer program, which comprises code means which when run on the radio network node 600 causes the CPU to perform steps of the procedure described earlier in conjunction with FIG. 5b. In other words, when said code means are run on the CPU, they correspond to the processing circuit 603 of FIG. 6. The processing circuit 603 and the transmitters, 601, 602, described above with reference to FIG. 6 may be logical units, separate physical units or a combination of both logical and physical units.

An embodiment of a method for an eNB, in the example denoted eNB_1, is illustrated in FIG. 7. In a first step, 71, the eNB_1 assesses the traffic load in one or more cells that it hosts. The assessment involves calculating the subscription ratio value. In case the cells hosted by the eNB_1 have any neighbor cell relation with one or more cells hosted by another eNB, eNB_2, and that are deployed on a frequency carrier other than that or those of the cells hosted by eNB_1, traffic load information relating to the cells, is exchanged between eNB_1 and eNB_2, in the next step, 72.

In the following step, 73, eNB_1 controls the mobility of connected mode UEs served in any of the cells hosted by eNB_1 to be adapted to balance the traffic load in the cells, such that some UE will prefer a less loaded cell. Thereby the traffic load will be more evenly distributed between cells on the different frequency layers. In the last step, 74, the eNB_1 provides idle mode UE camping in any of the cells it hosts with information on cell reselection priorities. The cell reselection priorities indicates a higher priority for the cell the UE is camping in over neighboring cells on other frequency carriers. The purpose is to maintain the load balancing that was achieved when the UE was in active mode, and let the UE perform the cell reselection to another frequency carrier only when the cell the UE is camping in provides bad coverage. Step 74 thus corresponds to the steps described with reference to FIG. 5a-b above.

In case eNB_1 hosts cells on all available frequency carriers, or if there are no neighboring cells on a frequency carrier other than those of the cells hosted by eNB_1, then exchange of traffic load information between the two eNB is not needed. Step 72 is depicted in dashed lines to indicate it is not needed in all situations, to do the load balancing of the present method.

Figure 8:
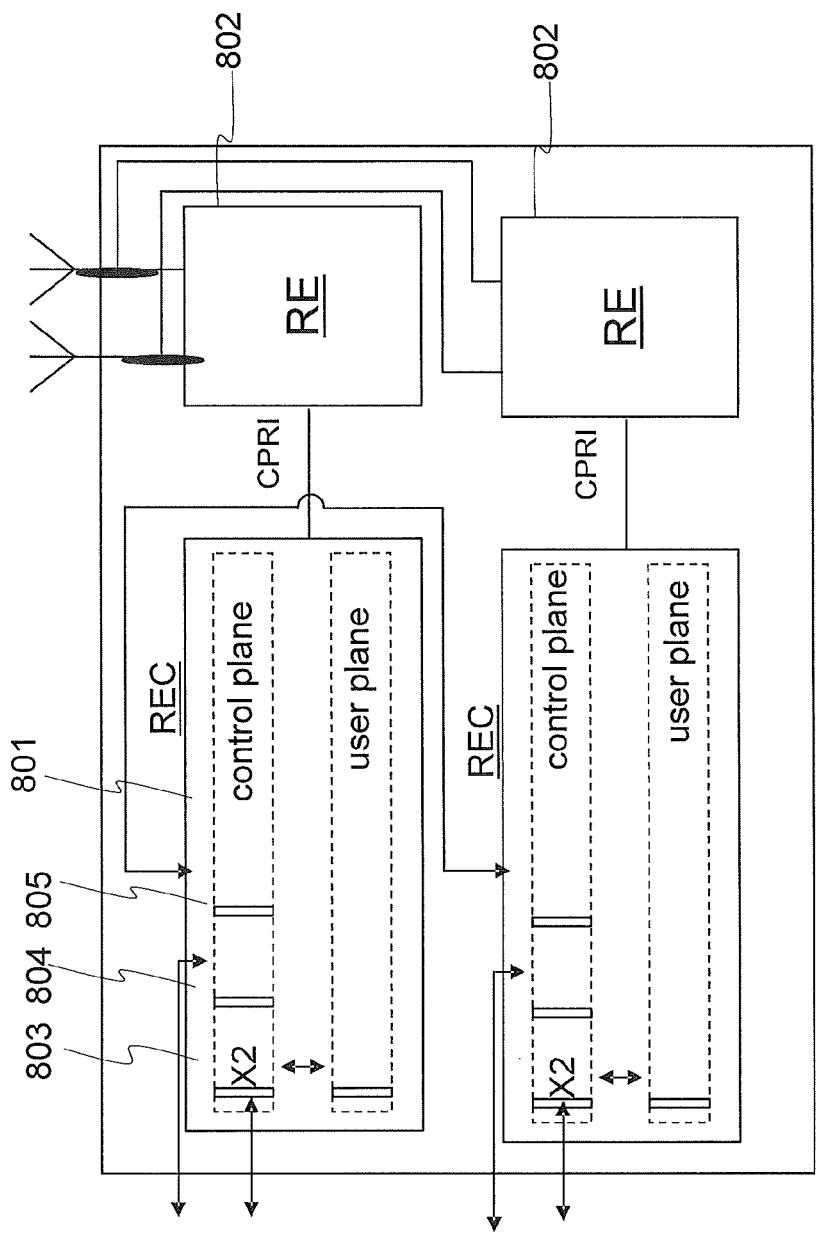
FIG. 8 is a block diagram schematically illustrating a radio network node according to embodiments.

FIG. 8 depicts an eNB that has been adapted for carrying out the method of FIG. 7. The eNB comprises as Radio Equipment (RE) 802, and a Radio Equipment Controller (REC) 801, that are connected via a standardized CPRI interface. The RE comprises the radio parts, and the REC comprises the base band and control functions as is a conventional construction of a radio base station. This is a common architecture of the eNB, albeit also other alternative architectures are feasible that may be adapted for performing the method of FIG. 7. The REC is constructed of plural processor circuits and memory circuits that are controlled by software. The processor capacity is conventionally constructed to be flexibly assignable for handling different types of processing. The processes handled by the REC are divided into user plane and control plane. The parts adapted for carrying out the method of FIG. 7 relate to the control plane functions, and involves:

Processors and software assigned to an X2 interface 803, for communication with other eNB;

An interface 804 for communicating cell load and configuration data with an external database and or with an O&M system typically via an IP network or via an other type of connection;

Control units 805 whose processors are controlled by software to assess traffic load, to provide other eNB with traffic load information via the X2 interface and to control mobility of active mode UE to spread the distribution of traffic load among the different frequency layers. The control unit, 805, is also configured to provide the cell reselection priorities to the idle mode UE, typically by broadcasting system information via the CIPRI and the RE, 802.

In FIG. 8 the RE and the REC in combination are assumed to handle one cell each. When the eNB host plural cells, a set of RE, 802, and REC, 801, is assigned for supporting a respective cell. In FIG. 8, the control units, 805, have a connection for exchanging load information between the REC, 801, that handle different cells. Alternatively, one REC in the eNB is adapted for hosting communication in plural cell via a respective RE for each of the cells.

The above mentioned and described embodiments are only given as examples and should not be limiting. Other solutions, uses, objectives, and functions within the scope of the accompanying patent claims may be possible.

The invention claimed is:

1. A method, in a radio network node of a radio communications system operating on multiple carrier frequencies, for constraining cell reselection of a user equipment to intra-frequency cell reselection, wherein the radio network node hosts a first cell operating on a first carrier frequency and a second cell overlapping with the first cell and operating on a second carrier frequency, the method comprising:
    broadcasting information comprising a cell reselection priority for each of the first and the second carrier frequencies in the first cell, wherein the cell reselection priority of the first carrier frequency is configured to be higher than the cell reselection priority of the second carrier frequency;
    broadcasting information comprising a cell reselection priority for each of the first and the second carrier frequencies in the second cell, wherein the cell reselection priority of the second carrier frequency is configured to be higher than the cell reselection priority of the first carrier frequency;
    such that at least one user equipment camping on the first or the second cell will primarily perform intra-frequency cell reselection based on the broadcasted information.

2. The method of claim 1, wherein the information broadcasted in the first cell further comprises at least one of:
    a threshold indicating a minimum reception quality for the first carrier frequency;
    a threshold indicating a minimum reception quality for the second carrier frequency.

3. The method of claim 1, wherein the information broadcasted in the second cell further comprises at least one of:
    a threshold indicating a minimum reception quality for the first carrier frequency;
    a threshold indicating a minimum reception quality for the second carrier frequency.

4. The method of claim 1, further comprising applying load-balancing inter-frequency handover and/or redirection to achieve a balanced distribution, in the first and second cell, of user equipment in connected mode.

5. The method of claim 1, wherein the radio network node is a radio base station.

6. The method of claim 1, wherein the radio network node is a radio control node.

7. A radio network node, of a radio communications system operating on multiple carrier frequencies, adapted to constrain cell reselection of a user equipment to intra-frequency cell reselection, wherein the radio network node is adapted to host a first cell operating on a first carrier frequency and a second cell overlapping with the first cell and operating on a second carrier frequency, the radio network node comprising:
    a first transmitter configured to broadcast information comprising a cell reselection priority for each of the first and the second carrier frequencies in the first cell, wherein the cell reselection priority of the first carrier frequency is configured to be higher than the cell reselection priority of the second carrier frequency;
    a second transmitter configured to broadcast information comprising a cell reselection priority for each of the first and the second carrier frequencies in the second cell, wherein the cell reselection priority of the second carrier frequency is configured to be higher than the cell reselection priority of the first carrier frequency;
    such that at least one user equipment camping on the first or the second cell will primarily perform intra-frequency cell reselection based on the broadcasted information.

8. The radio network node of claim 7, wherein the first transmitter is adapted to broadcast information in the first cell further comprising at least one of:
    a threshold indicating a minimum reception quality for the first carrier frequency;
    a threshold indicating a minimum reception quality for the second carrier frequency.

9. The radio network node of claim 7, wherein the second transmitter is adapted to broadcast information in the second cell further comprising at least one of:
    a threshold indicating a minimum reception quality for the first carrier frequency;
    a threshold indicating a minimum reception quality for the second carrier frequency.

10. The radio network node of claim 7, further comprising a processing circuit adapted to apply load-balancing inter-frequency handover and/or redirection to achieve a balanced distribution, in the first and second cell, of user equipment in connected mode.

11. The radio network node of claim 7, wherein the radio network node is a radio base station.

12. The radio network node of claim 7, wherein the radio network node is a radio control node.

* * * * *